US012734459B2

(12) United States Patent
Zheng

(10) Patent No.: US 12,734,459 B2
(45) Date of Patent: Sep. 15, 2026

(54) DOUBLE-LAYER LUMINOUS FRISBEE

(71) Applicant: Ruiman Zheng, Shantou (CN)

(72) Inventor: Ruiman Zheng, Shantou (CN)

( * ) Notice: Subject to any disclaimer, the term of this patent is extended or adjusted under 35 U.S.C. 154(b) by 162 days.

(21) Appl. No.: 18/958,486

(22) Filed: Nov. 25, 2024

(65) Prior Publication Data

US 2026/0145095 A1 May 28, 2026

(51) Int. Cl.
*A63H 33/18* (2006.01)
*A63H 33/22* (2006.01)
*F21V 33/00* (2006.01)
*F21Y 115/10* (2016.01)

(52) U.S. Cl.
CPC ............. *A63H 33/18* (2013.01); *A63H 33/22* (2013.01); *F21V 33/008* (2013.01); *F21Y 2115/10* (2016.08)

(58) Field of Classification Search
CPC ........ A63H 33/18; A63H 33/22; F21V 33/008
USPC ............................................................ 446/47
See application file for complete search history.

(56) References Cited

U.S. PATENT DOCUMENTS 4,301,616 A * 11/1981 Gudgel .................. A63H 33/18 446/47
4,431,196 A * 2/1984 Kutnyak ................ A63H 33/18 473/588
4,435,917 A * 3/1984 Lee ........................ A63H 33/18 446/47
5,032,098 A * 7/1991 Balogh .................. A63H 33/18 473/588
5,290,184 A * 3/1994 Balogh .................. A63H 33/18 446/485
5,319,531 A * 6/1994 Kutnyak ................ A63H 33/18 473/588
5,720,651 A * 2/1998 Chien .................... A63H 33/18 415/115
5,882,239 A * 3/1999 Trichak .................. A63H 33/18 473/588
6,783,421 B1 * 8/2004 Lopez .................... A63H 23/10 446/485
7,347,758 B2 * 3/2008 Moore ................... A63H 33/18 446/219
12,290,760 B2 * 5/2025 Liu ........................ A63H 27/12
12,364,932 B1 * 7/2025 Liao ....................... A63B 65/10
2004/0141311 A1 * 7/2004 Chen ...................... A63H 33/18 362/253
2023/0037021 A1 * 2/2023 Hoang ................... A63H 33/18
2023/0211246 A1 * 7/2023 Liu ........................ A63H 33/18 446/236

(Continued)

*Primary Examiner* — Kristina R Fulton
(74) *Attorney, Agent, or Firm* — Sang Young Han

(57) ABSTRACT

The disclosure provides a double-layer luminous frisbee including a shell and a luminous body assembly. A middle part of the shell is provided with a luminous mounting hole, and the luminous body assembly is embedded in the luminous mounting hole in the middle part of the shell, and seamlessly butted and buckled on the shell. The disclosure has the following beneficial effects: with a first luminous body on an outer sidewall of a shell or a second luminous body in a middle part of the shell, the frisbee can emit light in the throwing process, so that the double-layer luminous frisbee has multiple functions, thereby making the frisbee throwing more fun. The double-layer luminous frisbee has the advantages of simple structure, good decorative effect and beautiful appearance, and is convenient to carry.

6 Claims, 4 Drawing Sheets

(56) References Cited

U.S. PATENT DOCUMENTS

2024/0252947 A1* 8/2024 Lin ........................ A63H 33/18

* cited by examiner

DOUBLE-LAYER LUMINOUS FRISBEE

TECHNICAL FIELD

The disclosure relates to the technical field of sports equipment, and in particular to a double-layer luminous frisbee.

BACKGROUND

The existing frisbee is typically formed by a round plastic body. When in use, a user grips the periphery of the frisbee with one hand and throws the frisbee out, so that the frisbee can land or be caught by a partner after rotating and gliding a certain distance in the air, so as to achieve the recreation effect. Since the existing frisbee is typically made of plastic, it has good hardness and flying effect. However, the frisbee made of plastic has high hardness and may easily hurt people.

SUMMARY

An objective of the disclosure is to provide a novel double-layer luminous frisbee to solve the above technical problem. With a first luminous body on an outer sidewall of a shell or a second luminous body in a middle part of the shell, the frisbee can emit light in the throwing process, so that the double-layer luminous frisbee has multiple functions, thereby making the frisbee throwing more fun. The double-layer luminous frisbee has the advantages of simple structure, good decorative effect and beautiful appearance, and is convenient to carry.

The disclosure is implemented by the following technical solutions:

A double-layer luminous frisbee includes a shell and a luminous body assembly. A middle part of the shell is provided with a luminous mounting hole, and the luminous body assembly is embedded in the luminous mounting hole in the middle part of the shell, and seamlessly butted and buckled on the shell.

Further, an outer sidewall of the shell is provided with a plurality of layers of luminous body clamping grooves, an inner sidewall of the middle part of the shell is provided with a plurality of convex columns, and an inner sidewall of one side of the shell is provided with a wire groove.

Further, the luminous body assembly includes an upper cover plate, a lower cover plate, a control circuit board, a first luminous body, a second luminous body, a wire and a battery, a periphery of a bottom of the lower cover plate is provided with a plurality of through holes, the convex columns on the inner sidewall of the middle part of the shell are inserted into the through holes on the periphery of the bottom of the lower cover plate and fixed to the middle part of the shell, the upper cover plate is arranged above the lower cover plate, the lower cover plate is provided with a cavity, the control circuit board is arranged in the cavity, one side of the control circuit board is provided with the battery, the wire is embedded in the wire groove in the inner sidewall of one side of the shell, one end of the wire is electrically connected with the control circuit board, the other end of the wire is respectively electrically connected with the first luminous body and the second luminous body, the first luminous body is embedded in the luminous body clamping groove in the outer sidewall of the shell, the second luminous body is arranged between the upper cover plate and the lower cover plate, the control circuit board is electrically connected with the first luminous body, the second luminous body and the battery, and the first luminous body and the second luminous body are respectively electrically connected with the battery.

Further, the lower cover plate is provided with a switch button mounting position.

Further, the control circuit board is provided with a plurality of switch buttons, the switch buttons are embedded in the switch button mounting position on the lower cover plate, and the switch buttons are electrically connected with the control circuit board, the first luminous body, the second luminous body, the wire and the battery.

Further, the first luminous body and the second luminous body are LED lamps or light bars.

Further, the upper cover plate and the lower cover plate are made of soft rubber or silicone or transparent plastic.

Further, the shell is made of soft rubber or silicone or transparent plastic.

The disclosure has the following beneficial effects: with the first luminous body on the outer sidewall of the shell or the second luminous body in the middle part of the shell, the frisbee can emit light in the throwing process, so that the double-layer luminous frisbee has multiple functions, thereby making the frisbee throwing more fun. The double-layer luminous frisbee has the advantages of simple structure, good decorative effect and beautiful appearance, and is convenient to carry.

Figure 1:
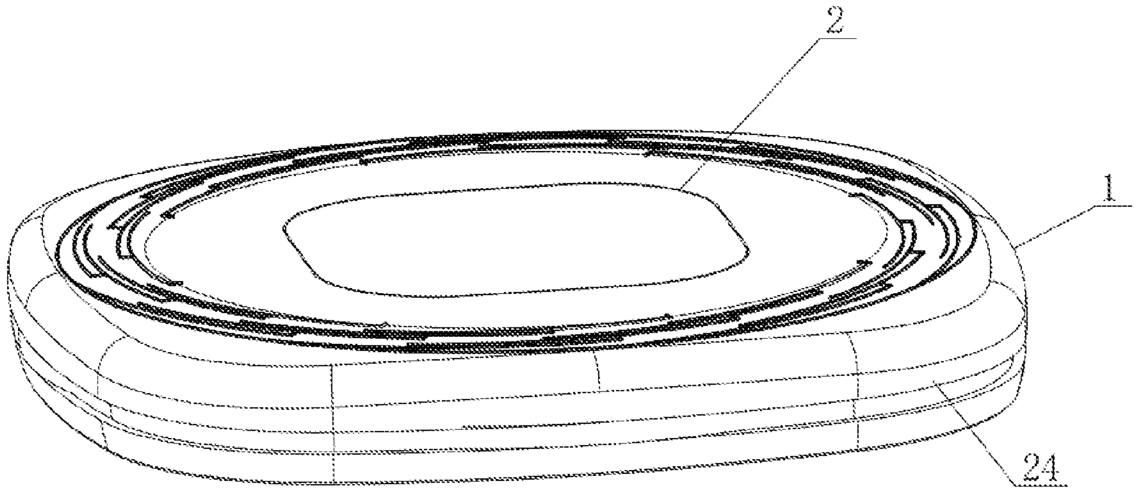
FIG. 1 is a schematic structural view of a double-layer luminous frisbee according to the disclosure.

Reference numerals: 1, shell; 11, luminous mounting hole; 12, luminous body clamping groove; 13, wire groove; 14, convex column; 2, luminous body assembly; 21, upper cover plate; 22, lower cover plate; 220, through hole; 221, cavity; 222, switch button mounting position; 23, control circuit board; 24, luminous body; 25, wire; 26, battery; 27, switch button; and 28, second luminous body.

DETAILED DESCRIPTION

The disclosure will be further described below in conjunction with the accompanying drawings and specific implementations:

Unless otherwise defined, all technical and scientific terms used herein have the same meaning as that commonly understood by a person skilled in the art in the present application. The terms used herein are merely for the purpose of describing specific embodiments and are not intended to limit the present application. Terms "comprises" and "have" as well as any variation thereof in the specification and claims as well as the description of the drawings in the present application are intended to cover non-exclusive inclusion. The terms "first", "second" and the like in this specification and the claims or the accompanying drawings in the present application are used to distinguish different objects and are not used to describe a specific sequence.

"Embodiment" mentioned in the specification means that particular features, structures, or characteristics described with reference to the embodiment may be included in at least one embodiment of the present application. The phrase appearing at different positions of this specification may not refer to the same embodiment or an independent or alternative embodiment that is mutually exclusive with other embodiments. A person skilled in the art explicitly or implicitly understands that the embodiments described in the specification may be combined with other embodiments.

Figure 2:
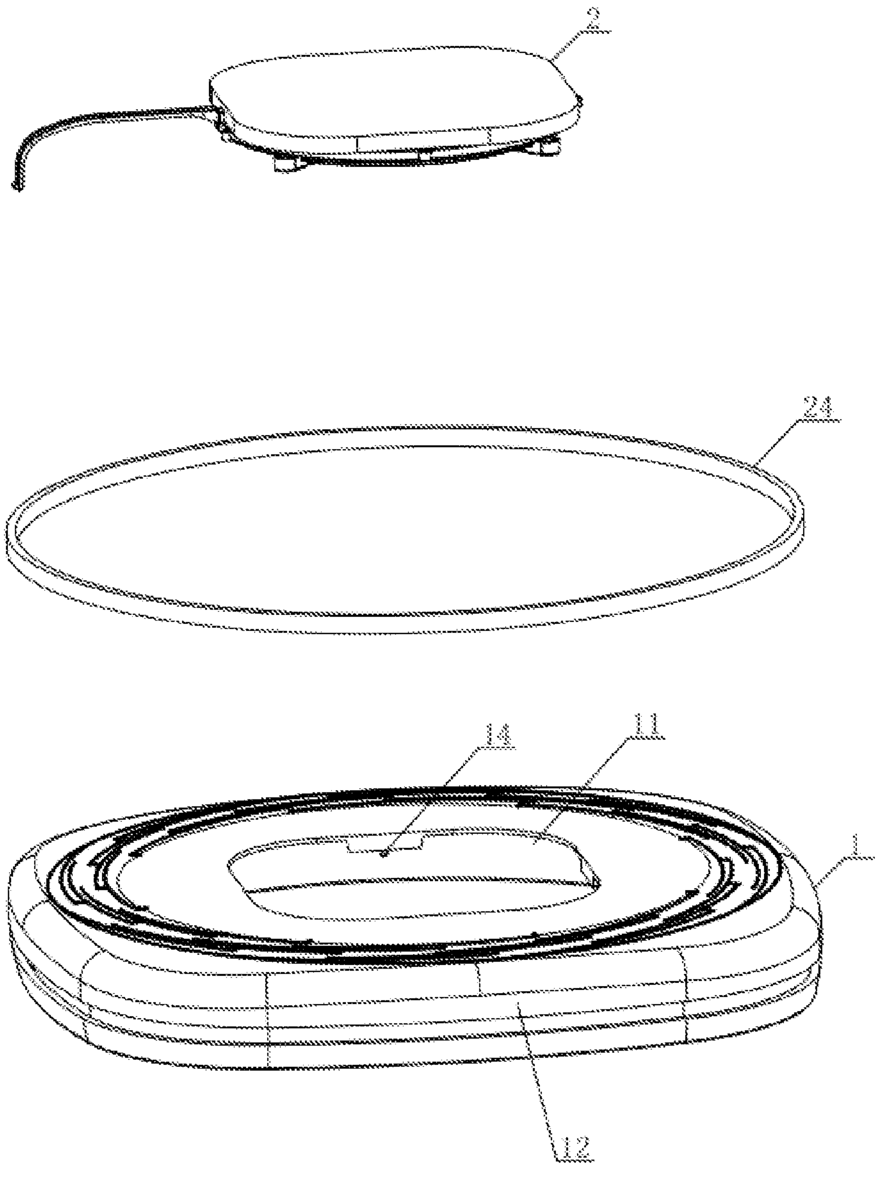
FIG. 2 is a schematic structural exploded view of the double-layer luminous frisbee according to the disclosure.
Figure 3:
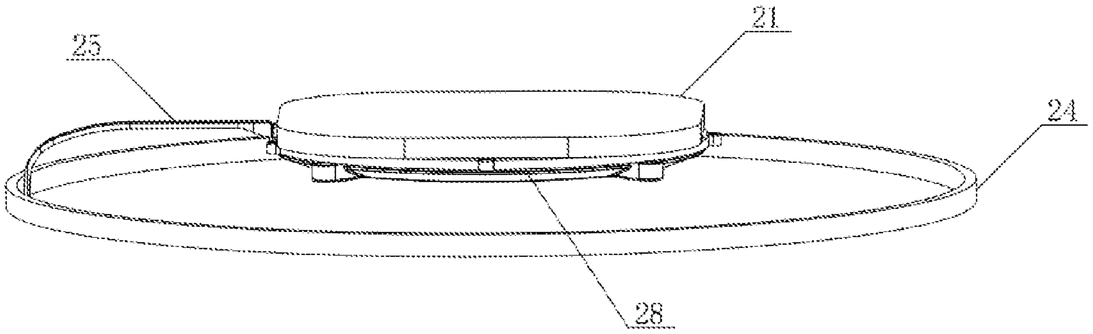
FIG. 3 is a schematic structural view of a luminous body assembly according to the disclosure.
Figure 4:
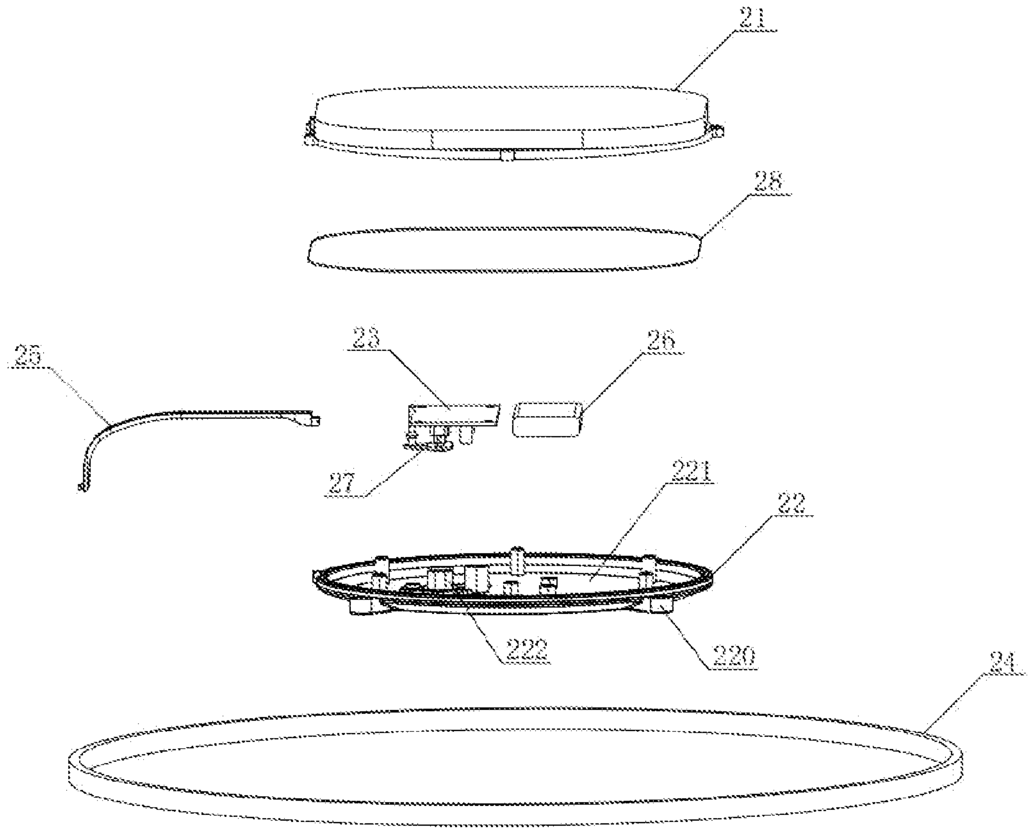
FIG. 4 is a schematic structural exploded view of the luminous body assembly according to the disclosure.
Figure 5:
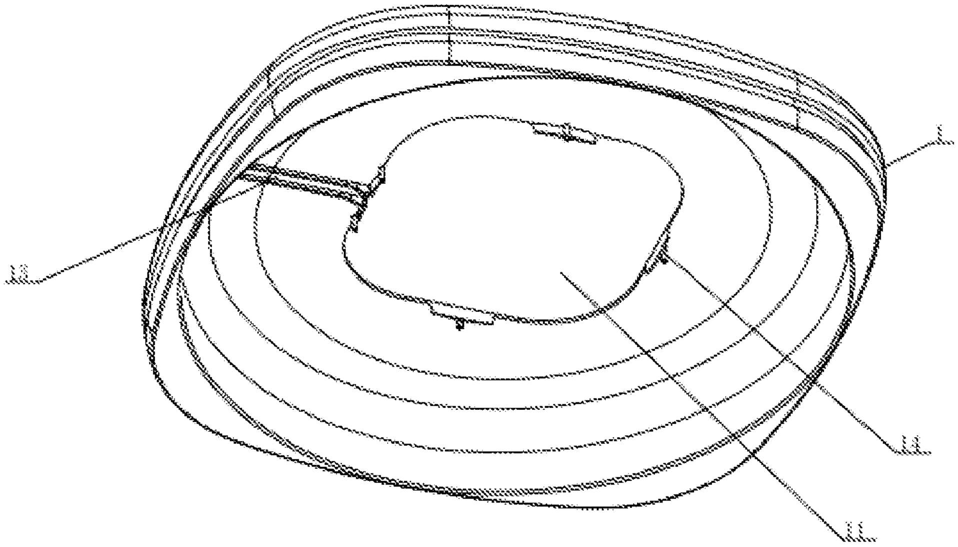
FIG. 5 is a schematic structural bottom view of a shell according to the disclosure.

Referring to FIG. 1 to FIG. 5, a double-layer luminous frisbee includes a shell 1 and a luminous body assembly 2. A middle part of the shell 1 is provided with a luminous mounting hole 11, and the luminous body assembly 2 is embedded in the luminous mounting hole 11 in the middle part of the shell 1, and seamlessly butted and buckled on the shell 1.

Preferably, an outer sidewall of the shell 1 is provided with a plurality of layers of luminous body clamping grooves 12, an inner sidewall of the middle part of the shell 1 is provided with a plurality of convex columns 14, and an inner sidewall of one side of the shell 1 is provided with a wire groove 13.

Preferably, the luminous body assembly 2 includes an upper cover plate 21, a lower cover plate 22, a control circuit board 23, a first luminous body 24, a second luminous body 28, a wire 25 and a battery 26. A periphery of a bottom of the lower cover plate 22 is provided with a plurality of through holes 220. The convex columns on the inner sidewall of the middle part of the shell are inserted into the through holes on the periphery of the bottom of the lower cover plate and fixed to the middle part of the shell 1. The upper cover plate 21 is arranged above the lower cover plate 22. The lower cover plate 22 is provided with a cavity 221. The control circuit board 23 is arranged in the cavity 221. One side of the control circuit board 23 is provided with the battery 26. The wire 25 is embedded in the wire groove 13 in the inner sidewall of one side of the shell 1. One end of the wire 25 is electrically connected with the control circuit board 23. The other end of the wire 25 is respectively electrically connected with the first luminous body 24 and the second luminous body 28. The first luminous body 24 is embedded in the luminous body clamping groove 12 in the outer sidewall of the shell 1. The second luminous body 28 is arranged between the upper cover plate 21 and the lower cover plate 22. The control circuit board 23 is electrically connected with the first luminous body 24, the second luminous body 28 and the battery 26. The first luminous body 24 and the second luminous body 28 are respectively electrically connected with the battery 26.

Preferably, the lower cover plate 22 is provided with a switch button mounting position 222.

Preferably, the control circuit board 23 is provided with a plurality of switch buttons 27, the switch buttons 27 are embedded in the switch button mounting position 222 on the lower cover plate 22, and the switch buttons 27 are electrically connected with the control circuit board 23, the first luminous body 24, the second luminous body 28, the wire 25 and the battery 26.

Preferably, the first luminous body 24 and the second luminous body 28 are LED lamps or light bars.

Preferably, the upper cover plate 21 and the lower cover plate 22 are made of soft rubber or silicone or transparent plastic.

Preferably, the shell 1 is made of soft rubber or silicone or transparent plastic.

Based on the above, according to the double-layer luminous frisbee, with the first luminous body on the outer sidewall of the shell or the second luminous body in the middle part of the shell, the frisbee can emit light in the throwing process, so that the double-layer luminous frisbee has multiple functions, thereby making the frisbee throwing more fun. The double-layer luminous frisbee has the advantages of simple structure, good decorative effect and beautiful appearance, and is convenient to carry.

According to the disclosure and teachings of the specification above, those skilled in the art to which the disclosure belongs can also make appropriate changes and modifications to the above implementations. Therefore, the disclosure is not limited to the specific implementations disclosed and described above, and some modifications and changes to the disclosure shall also fall within the scope of protection of the claims of the disclosure. In addition, although some specific terms are used in this specification, these terms are only for the convenience of description and do not constitute any limitations to the disclosure.

What is claimed is:

1. A double-layer luminous frisbee, comprising a shell and a luminous body assembly, wherein a middle part of the shell is provided with a luminous mounting hole, and the luminous body assembly is embedded in the luminous mounting hole in the middle part of the shell, and seamlessly butted and buckled on the shell, wherein an outer sidewall of the shell is provided with a plurality of layers of luminous body clamping grooves, an inner sidewall of the middle part of the shell is provided with a plurality of convex columns, and an inner sidewall of one side of the shell is provided with a wire, wherein the luminous body assembly comprises an upper cover plate, a lower cover plate, a control circuit board, a first luminous body, a second luminous body, a wire and a battery, a periphery of a bottom of the lower cover plate is provided with a plurality of through holes, the convex columns on the inner sidewall of the middle part of the shell are inserted into the through holes on the periphery of the bottom of the lower cover plate and fixed to the middle part of the shell, the upper cover plate is arranged above the lower cover plate, the lower cover plate is provided with a cavity, the control circuit board is arranged in the cavity, one side of the control circuit board is provided with the battery, the wire is embedded in the wire groove in the inner sidewall of one side of the shell, one end of the wire is electrically connected with the control circuit board, the other end of the wire is respectively electrically connected with the first luminous body and the second luminous body, the first luminous body is embedded in the luminous body clamping groove in the outer sidewall of the shell, the second luminous body is arranged between the upper cover plate and the lower cover plate, the control circuit board is electrically connected with the first luminous body, the second luminous body and the battery, and the first luminous body and the second luminous body are respectively electrically connected with the battery.

2. The double-layer luminous frisbee according to claim 1, wherein the lower cover plate is provided with a switch button mounting position.

3. The double-layer luminous frisbee according to claim 2, wherein the control circuit board is provided with a plurality of switch buttons, the switch buttons are embedded in the switch button mounting position on the lower cover plate, and the switch buttons are electrically connected with the control circuit board, the first luminous body, the second luminous body, the wire and the battery.

4. The double-layer luminous frisbee according to claim 1, wherein the first luminous body and the second luminous body are LED lamps or light bars.

5. The double-layer luminous frisbee according to claim 1, wherein the upper cover plate and the lower cover plate are made of soft rubber or silicone or transparent plastic.

6. The double-layer luminous frisbee according to claim 1, wherein the shell is made of soft rubber or silicone or transparent plastic.

* * * * *